May 31, 1966 H. J. CHALL 3,253,779

ACCUMULATOR DRIVE

Original Filed Sept. 18, 1961 14 Sheets-Sheet 1

May 31, 1966 H. J. CHALL 3,253,779

ACCUMULATOR DRIVE

Original Filed Sept. 18, 1961 14 Sheets-Sheet 2

May 31, 1966 H. J. CHALL 3,253,779

ACCUMULATOR DRIVE

Original Filed Sept. 18, 1961 14 Sheets-Sheet 3

May 31, 1966 H. J. CHALL 3,253,779

ACCUMULATOR DRIVE

Original Filed Sept. 18, 1961 14 Sheets-Sheet 4

ACCUMULATOR DRIVE

Original Filed Sept. 18, 1961

May 31, 1966 H. J. CHALL 3,253,779

ACCUMULATOR DRIVE

Original Filed Sept. 18, 1961 14 Sheets-Sheet 11

May 31, 1966 H. J. CHALL 3,253,779

ACCUMULATOR DRIVE

Original Filed Sept. 18, 1961 14 Sheets-Sheet 12

3,253,779
ACCUMULATOR DRIVE

Harold J. Chall, Castro Valley, Calif., assignor, by mesne assignments, to Friden, Inc., San Leandro, Calif., a corporation of Delaware Original application Sept. 18, 1961, Ser. No. 138,645, now Patent No. 3,145,923, dated Aug. 25, 1964. Divided and this application Mar. 27, 1964, Ser. No. 355,298
2 Claims. (Cl. 235—60)

The present invention relates to calculating machines, and more particularly to the controls for the entries into the accumulator.

The present application constitutes a division of my copending application Serial No. 138,645, filed September 18, 1961, now Patent No. 3,145,923, issued August 25, 1964.

Objects of the present invention include the provision of a high speed, automatic, calculating machine in which all digitation is performed early in each machine cycle for making a maximum time available for spring-driven tens-transfers in the accumulator, the provision of a calculating machine having mechanism for providing positive actuator operation during the first half of a digitation cycle, the provision of a calculator having mechanism for positively clearing a selector register for facilitating the transfer of a number therefrom to an actuator, the provision of a calculator in which the accumulator connections to the actuator are provided by a single gear pendant and shiftable drive gears, and the provision of an improved high speed calculator.

These and other objects and advantages of the present invention will be apparent from the following description of the specific embodiment thereof, and from the claims, taken in connection with the accompanying drawings in which:

The calculator of the present invention is described more completely in the parent application, Serial No. 138,645, of which this is a division, and in U.S. Patent No. 3,108,745. The machine is of the ten-key, reciprocating actuator type, and in its general features is constructed in accordance with U.S. Patent No. 2,832,530, and is similar to the well-known Friden adding machine.

SELECTION UNIT

Figure 1:
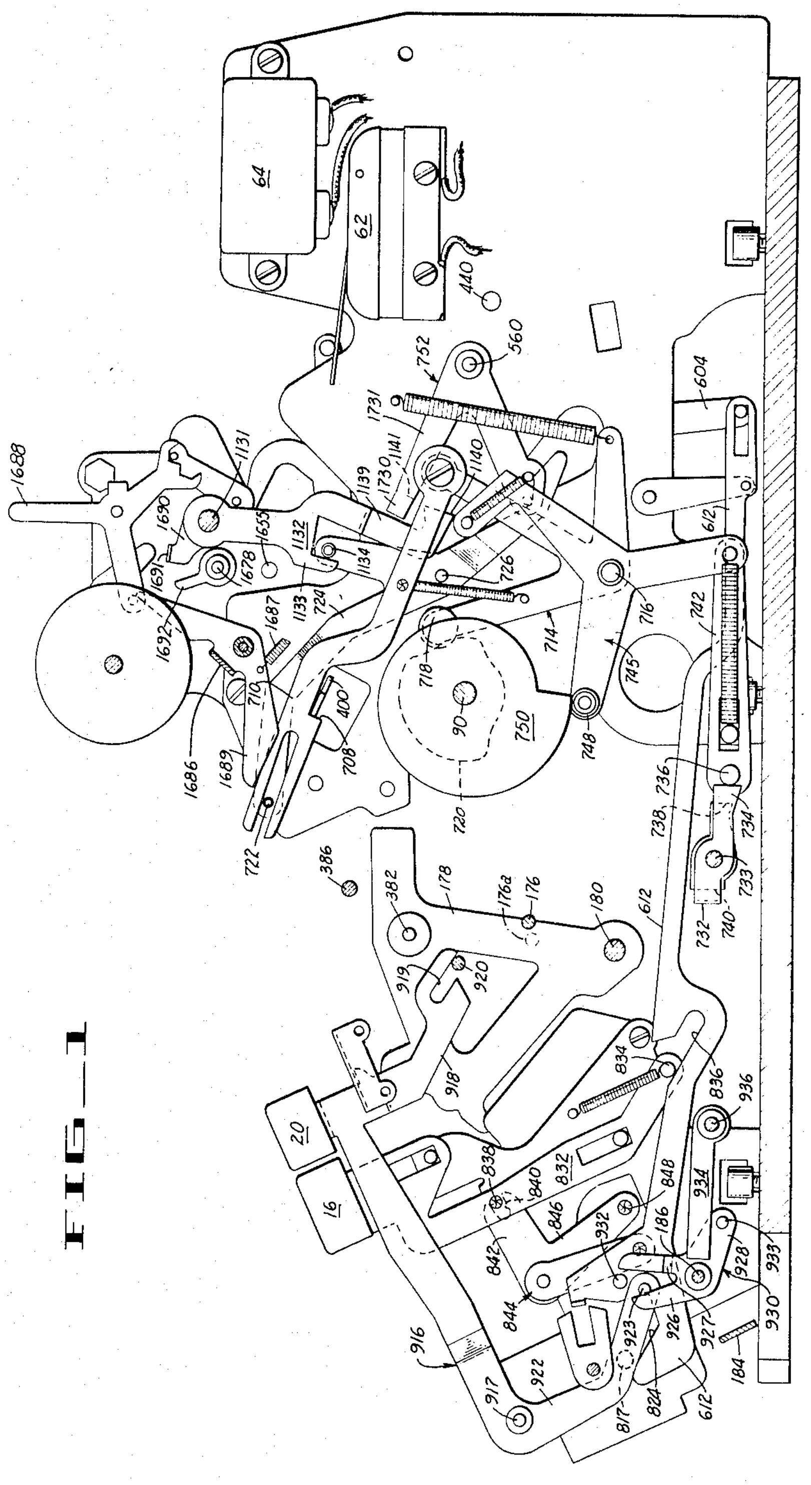
FIGS. 1 and 2 are right elevational, longitudinal sections (looking toward the left) of the calculator of the present invention, showing, for example, some of the mechanism for accumulator entries and total operations, the section of FIG. 2 being taken at a position to the left of that of FIG. 1.
Figure 11:
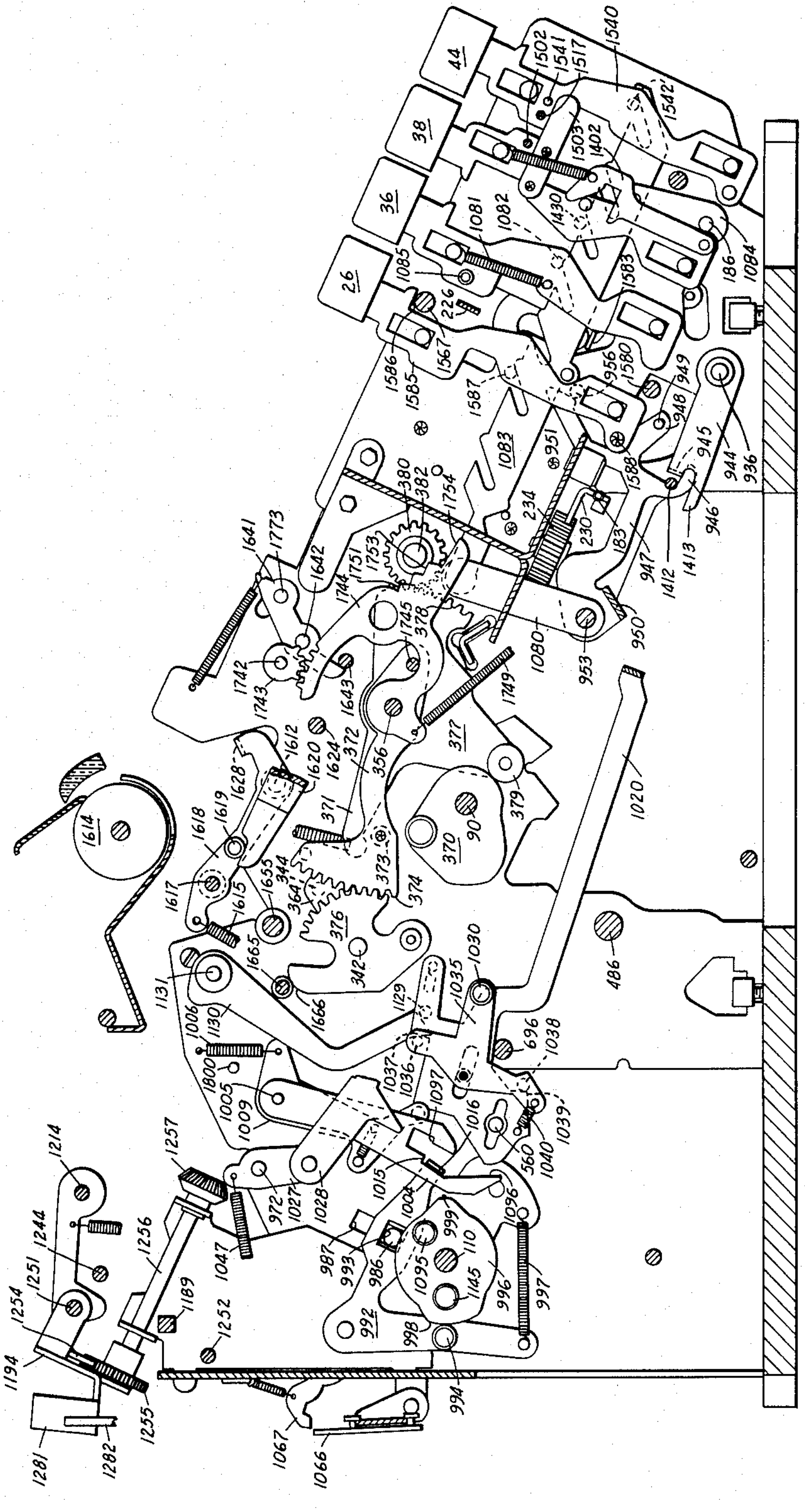
FIG. 11 is a left elevational section taken just to the left of the section of FIG. 10.

The selection unit is similar to the constructions shown in U.S. Patents Nos. 2,371,752, 2,832,530 and 2,832,532. A stationary portion includes the digit keys 9 (FIG. 5) and setting levers 194 (FIGS. 5 and 9), the location of which constitutes a selection station. A selection carriage, including right and left frame members 178 and 179 (FIGS. 1 and 5), slides transverse the machine on rods 180 and 181, and is spring-biased toward the left by a spring 183 (FIG. 11). The carriage also includes a selection sector 196 in each of sixteen numerical orders, and a biasing spring 195, a column of stop pins 198 and a zero latch 199 for each sector. As is explained in the prior patents referred to, in the home position of the selector, the leftmost order is aligned with the setting levers 194 at the selection station. Depression of one of the digit keys 10 sets a pin 198 and releases the zero latch 199 of the sector at the selection station for differentially setting the selector segment 196 of that order in accordance with the number, and indexes the carriage one order to the left to bring that order into alignment with the rightmost order of the actuator, and to bring the next order of the selector carriage in line with the setting levers 194. Each selector sector 196 carries a check dial 197 bearing numerals which are exposed through the check window provided in the cover (not shown) of the machine for showing the number set in the selector unit.

ACTUATOR

The actuator includes seventeen actuator sectors 340 (FIGS. 9 and 10) separately rotatable on a transverse actuator shaft 342. These sectors are similar in construction to those of the machine described in U.S. Patent 2,832,530, already referred to. A separate sector 340 is provided for each numerical order of the machine. These sectors are oscillated about the shaft 342 during each operating cycle of the machine by an actuator bail rod 344, which lies in slots 341 in the sectors.

Bail rod 344 is driven by actuator cams on the main drive shaft 90. A lead cam 348 and a trail cam 349 (FIG. 5) engage two rollers 350 and 352, respectively, carried by a yoke 354 which is fixed to the right end of a transverse shaft 356. This yoke includes gear segment 358 (FIG. 5), which meshes with a segment 360 fixed on the actuator shaft 342. A bail arm 362, fixed to the shaft 342, carries of the right end of the bail rod 344, and a similar bail arm 364 (FIG. 11), also fixed to the actuator shaft 342, supports the left end of the bail rod 344. Also located on the left side of the machine (FIG. 11) is a second gear segment 376, similar to segment 360 and similarly fixed to the shaft 342. Gear segment 376 meshes a gear segment 374 which is part of a lever 372 journalled on shaft 356. Lever 372 carries a pin 373 which lies under a rearward extending arm 371 of a lever 377 which carries a roller 379 riding a cam 370. During the first half of each operating cycle of the machine, the actuator cam 348 (FIG. 5) and the cam 370, through lever 377 and pin 373 (FIG. 11), drive the actuator bail 344 down (counter-clockwise in FIG. 9). During this motion, the bail 344 drives against a hook-shaped, spring-loaded member 345 on each actuator sector 340 for driving the sector as far (counter-clockwise in FIG. 9) as it is free to rotate. As is well known, the limit on the rotation of each actuator sector is imposed by the element, such as a selector sector 196, from which a digit is being transferred to the actuator sector. During the second half of each operating cycle of the machine, the bail 344 is returned to its home position, shown in FIG. 9, for returning all of the actuator sectors 340 to their uppermost, or home, positions.

SELECTOR CLEARING BAIL

Cam follower 377 (FIG. 11) also includes a gear segment 378 which drives a pinion 380 on the shaft 382, which supports the selector sectors 196 (FIGS. 5 and 10), and carries a pair of similar bail arms 384 and bail rod 386. The bail rod 386 provides an auxiliary drive for positively returning the selector sectors 196 to their "0," or home, position, during each operating cycle of the machine, and so relieves the spring-controlled drive members 345 (FIG. 9) of part of their load. It ensures that all selector sectors 196 are returned to their "0" positions whether they are aligned with actautor sectors or not, and permits the selector to be cleared during total and subtotal operations.

Bail rod 386 also controls the spring-urged operation of the selector sectors 196 during repeat operations and multiplication. In each cycle of such an operation, after the sectors 196 have been driven to their "0" positions for transferring the number from the selector to the actuator, they are released to be reset by their individual springs 195 (FIG. 5), the zero latches 199 being then blocked. At that time bail rod 386 pauses slightly away from its extreme excursion, and the sectors 196 stop against it. Then as the rod 386 rocks (clockwise in FIG. 5) to its home position, the sectors 196 follow it and are stopped individually in their selected positions, as by the pins 198. This action greatly reduces the tendency of the sectors 196 to bounce, and so, during the high speed operation for multiplication, it increases reliability by ensuring that the sectors will be at rest when they are re-engaged by a gear pendant (to be described) at the beginning of the next machine cycle.

FRONT GEAR PENDANT

Figure 18:
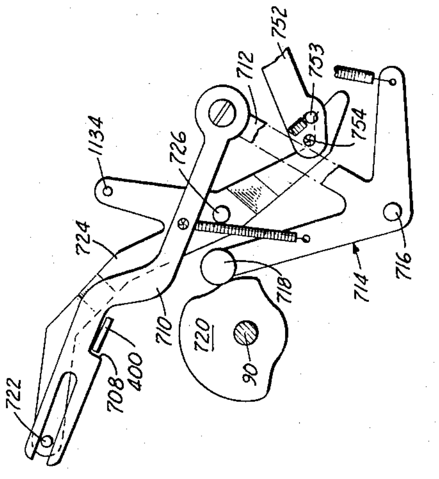

The actautor is arranged to be connected to the selector unit by means of a front gear pendant 390 of well-known construction. It includes a pair of frame members 392 (FIG. 10) and 394 (FIG. 9) supported on a transverse shaft 396. This shaft 396 and shafts 397 and 398 carry three gears for each order, the uppermost gear 395 being permanently in mesh with the actuator sector 340 and the lowest gear being arranged for movement into and out of mesh with the selector sector 196. Frame member 394 carries, at its upper end, an ear 400 which is normally embraced by a notch 708 of a link 710 (FIGS. 1 and 18) for moving the pendant.

Link 710 extends forward from an up-extending arm 712 of a bellcrank 714 journalled at 716. A second arm carries a roller 718 riding a front pendant control cam 720 on the main drive shaft 90. Bellcrank 714 is spring-biased (counter-clockwise as seein in FIG. 1) for holding the roller 718 against the cam. Cam 720 moves the link 710 rearward early in each machine cycle, holds it there until mid-cycle, and then moves it forward again. With the link 710 engaging the ear 400 of the front gear pendant 390, this action swings the pendant into engagement with the selector sectors 196 (FIG. 9) during the first half of the cycle so that the number set into the selector is transferred to the actuator, as is required in addition, subtraction, and certain other operations, and disengages the pendant from the sector at mid-cycle. The forward end of the link 710 is slotted, and guided on a pin 722 (FIGS. 1 and 18) on a bellcrank 724, which is journalled at 726. For totaling, memory-output, clear keyboard, and backspace operations, the bellcrank 724 is rocked clockwise in FIG. 18 for lifting the link 710 and notch 708 clear of the ear 400.

An aligning mechanism for the pendant 390 includes left and right blocking levers 404 and 406 (FIGS. 10 and 5) fixed to opposite ends of a transverse shaft 408. These levers include a blade 410 arranged to engage the forward and rear sides of projections 412 on the pendant frames 392 and 394 for holding the pendant in its home position and engaged position, respectively. These aligning levers 404, 406 are rocked by a lever 414 (FIG. 9), having a roller 415 riding a cam 416 on the main drive shaft 90. The aligning levers 404 and 406 hold the pendant 390 against movement during the downstroke, and again during the upstroke, of the actuator sectors 340, but release it for shifting at the home and half-way positions of the cycle.

REAR GEAR PENDANT

Figure 7:
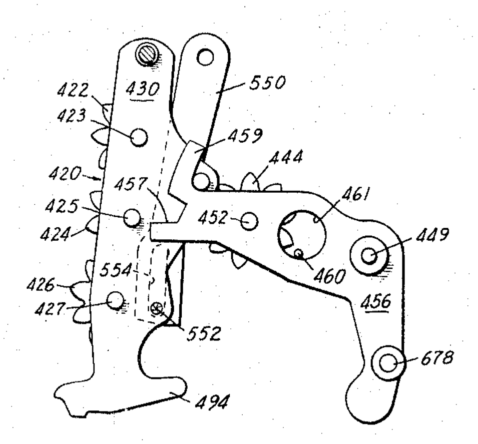
FIGS. 7 and 8 are right elevational views of part of the mechanism shown in FIG. 6 for explaining its operation.
Figure 8:
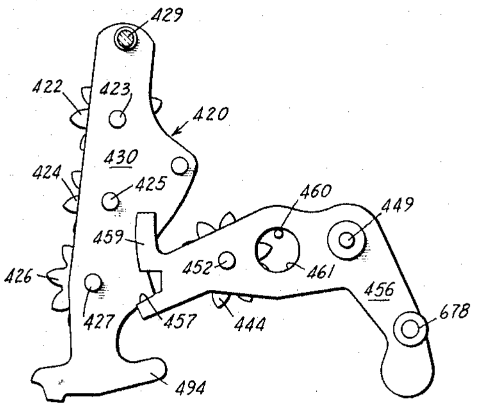

A rear gear pendant, indicated generally by the reference numeral 420 (FIG. 9), includes an upper gear 422, a middle gear 424 and a lower gear 426 for each numerical order of the actuator. Left and right frame members 428 and 430 (see also FIG. 15) are journalled on pins 429 and, in turn, carry shafts 423, 425 and 427 (FIGS. 7 and 8) on which the several gears 422, 424, and 426, respectively, turn free. The upper gears 422 (FIG. 9) are in constant mesh with their respective actuator sectors 340 and similarly the gears 422, 424 and 426 in each order are constantly in mesh. Left and right box cams 436 and 438 on a transverse shaft 440 (FIGS. 9, 10 and 15) embrace pins 437 and 439 for swinging the pendant 420 rearward and forward to carry gears 424, or alternatively the gears 426, as will be explained, into and out of engagement with drive gears 444 of an accumulator, indicated generally by the reference numeral 446. The upper portions 441 of the cam surface lie at a small angle with their direction of arcuate motion for providing a "dwell" for effectively locking the pendant 420 in its rear, or engaged, position.

ACCUMALATOR DRIVE GEARS

Figure 9:
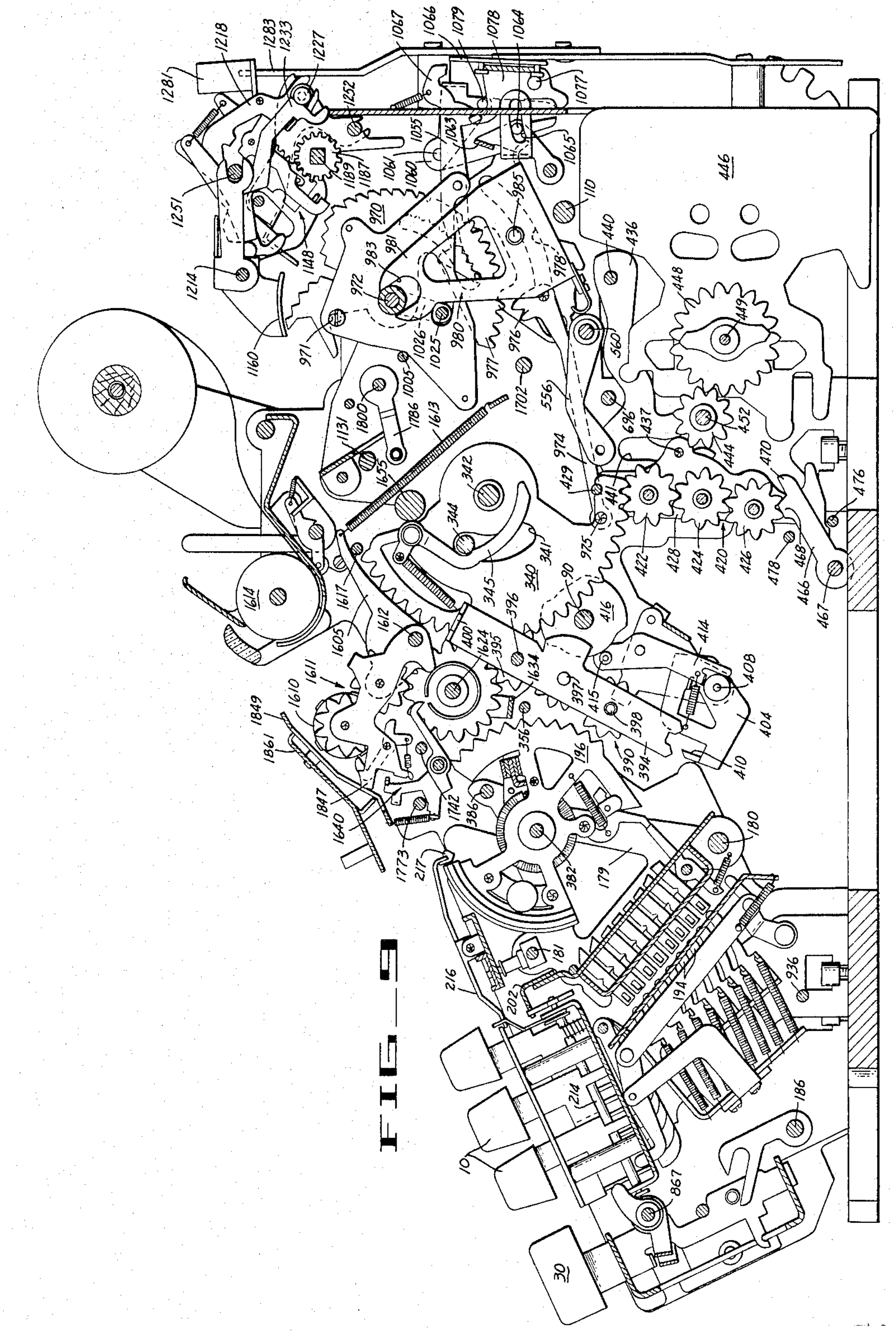
FIG. 9 is a right elevational section taken at a position to the left of that of the section of FIG. 6.
Figure 10:
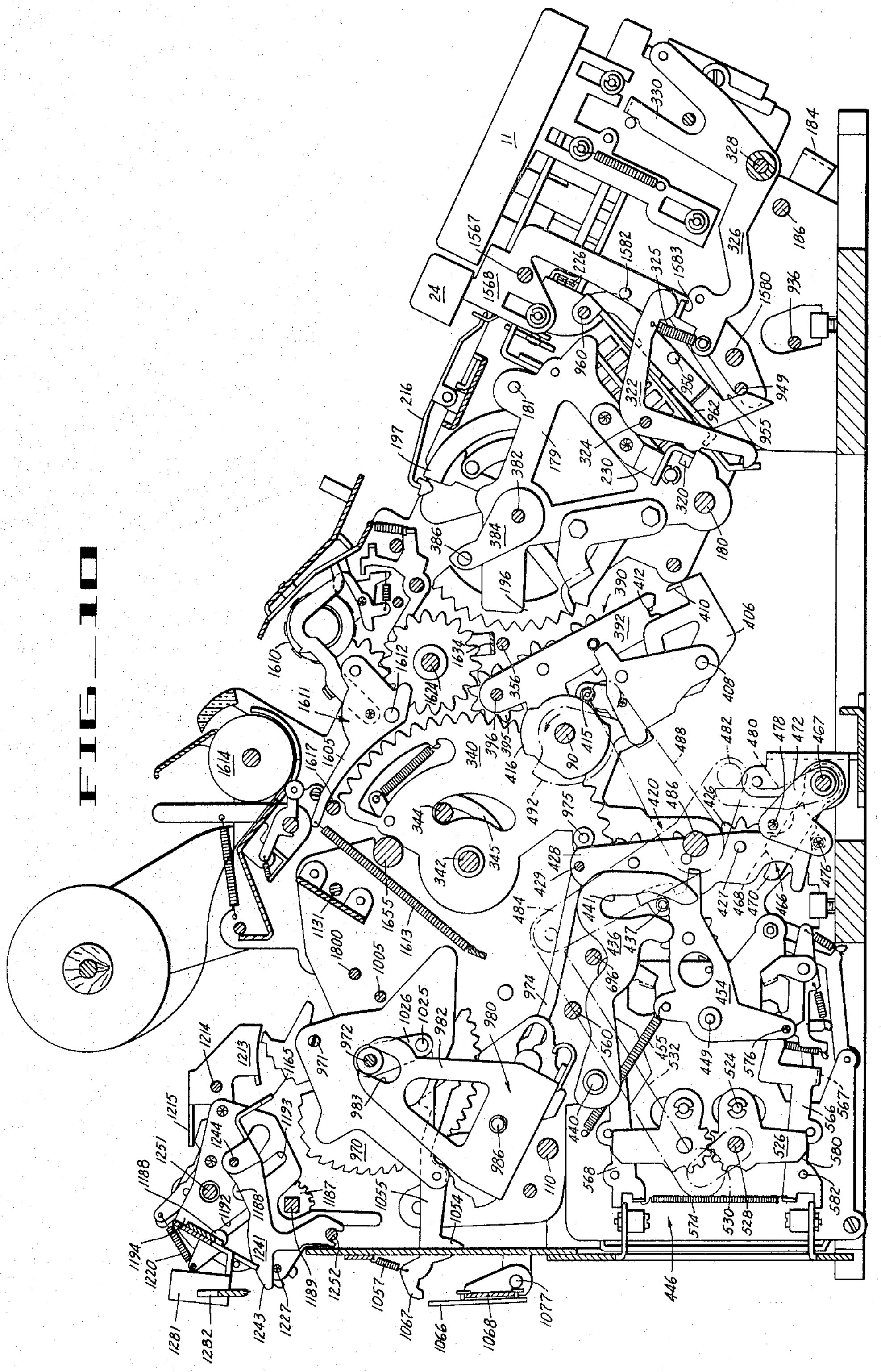
FIG. 10 is a left elevational, longitudinal section (looking toward the right) taken just to the left of the selector, actuator and accumulator.
Figure 14:
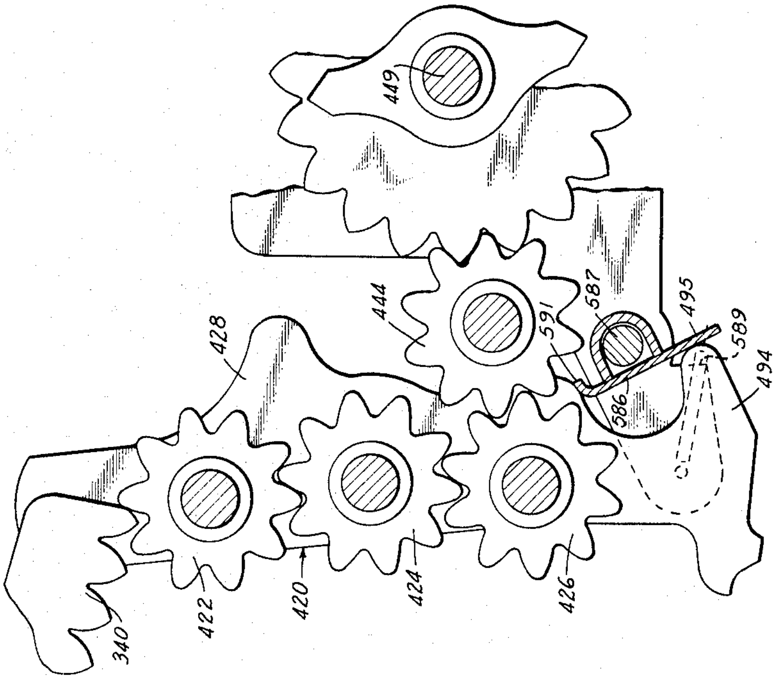

Each of the drive gears 444 is in constant mesh with a register gear 448 and is arranged to occupy its normal, upper, or home position, shown in FIG. 9, and a lower, alternative position shown in FIG. 14 for engagement with the gears 424 and 426, respectively. The drive gears 444 turn free on a shaft 452 carried by a pair of brackets 454 and 456 (FIGS. 6, 8 and 10) journalled on shaft 449 of the register gears 448, and are biased to their upper, normal position by a spring 455, as shown in FIG. 10. The forward end of the brackets 454 and 456 carry interlocking notches 457 (FIG. 8), which are aligned with the shafts 449 and 452. In the upper position of gear 444 (FIG. 7), notch 457 is aligned with the shaft 425 of the pendant gears 424, and in the lower position of the gear 444 (FIG. 8), the notch is aligned with the shaft 427 of the lowermost gears 426. These shafts enter the notches 457 for holding the gears in positive alignment during their engagement. The forward end of the drive gear brackets 454 and 456 also include an arcuate interlock portion 459 for obstructing the rearward motion of shaft 425 whenever the drive gear brackets 454 and 456 are between their extreme upper or lower positions. The upper and lower limits of the motion of the brackets 454 and 456 are determined by a pin 460 which extends through a hole 461 in the brackets. This interlock action between arms 454 and 456 and shafts 425 and 427 ensures proper alignment of the gears when engaged and also ensures that the pendant 420 is clear of the gears 444 as they move between their lower and upper positions.

In the operation of addition, a number is transferred from the selector to the actuator and simultaneously from the actuator to the accumulator 446. In this operation the drive gears 444 remain in their upper or normal position and the pendant 420 is moved rearward for engaging the gears 424 with the drive gears 444. The register gears 448 accordingly rotate counter-clockwise as seen in FIG. 9 for the positive entries. The subtraction is performed similarly except that the drive gears 444 are moved to their lower position 445 and are engaged by the lowest pendant gears 426 for driving the register gears 448 clockwise in FIG. 9. When a total or subtotal is read out of the accumulator 446, the drive gears 444 are controlled by a credit balance indicator 536 (FIGS. 6 and 4) as will be described. For a negative value in the accumulator, the drive gears 444 remain in their upper, or normal, position for engagement with the pendant gears 424. For a positive value in the accumulator, the drive gears 444 move to their lower position for engagement with the lowest pendant gears 426. For a total operation, the number is read out of the accumulator during the first half-cycle of operation and is printed, leaving the accumulator clear. For a subtotal operation, the number is read out of the accumulator in the first half-cycle, printed and then returned to the accumulator during the second half-cycle.

ACCUMULATOR

Figure 6:
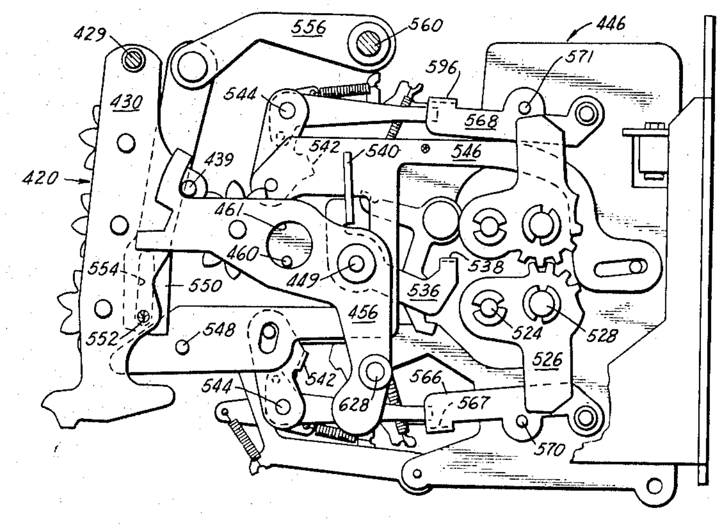
FIG. 6 is an enlarged right elevational section taken at a position to the left of that of the section of FIG. 5, showing the accumulator and its gear pendant.
Figure 12:
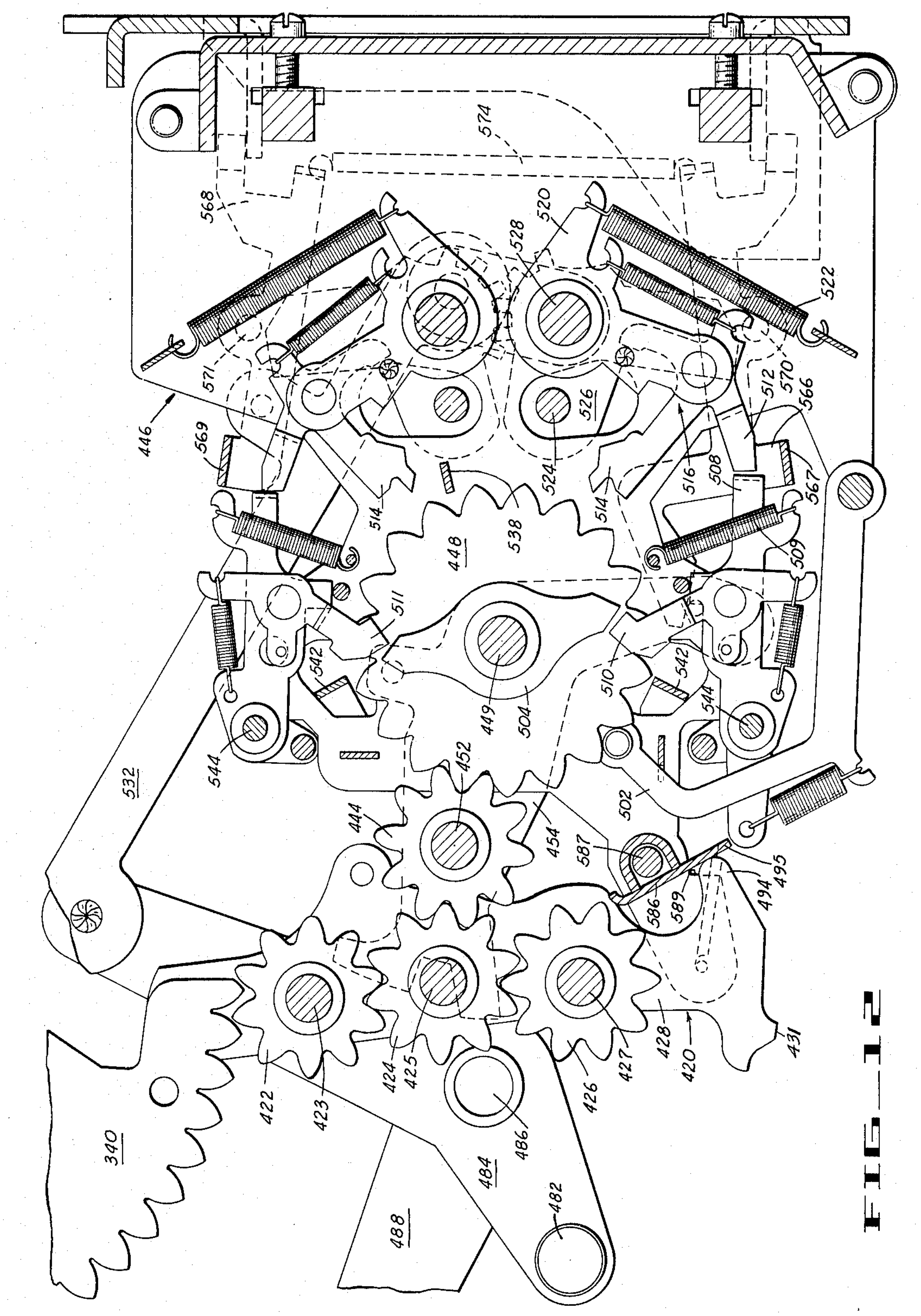
FIGS. 12, 13 and 14 are enlarged right elevational sections for showing the accumulator and its gear pendant, and for explaining their operation.

The accumulator 446 is best shown in FIGS. 6 and 12 and includes mechanism shown and described in the U.S. Patent No. 2,832,530 already referred to. Thus, the accumulator (FIG. 12) includes, for each numerical order, a twenty-tooth register gear 448 which is provided with a spring-pressed detent 502 for centering it in each digital position.

The accumulator includes a positive and a negative tens-transfer pawl 514 (FIG. 12) in each order, including "fugitive-one" transfers from the highest to the lowest order for permitting the readout of two negative values, or tru "credit balances," as is well known.

The accumulator includes an indicator of a well-known type, responsive to the fugitive-one transfer, for indicating the sign of the number in the accumulator. The bellcrank, or sign indicator, 536 (FIGS. 6 and 4) turns free on the main register shaft 449 and has a tongue 538 (see also FIG. 12) that lies in alignment with the pawl ends of the tens-transfer lever arms 516 in the lowest (right-hand) order. Tongue 538 will be rocked in opposite directions by these transfer pawls when the register goes through "0" in the positive and negative directions. Bellcrank 536 (FIGS. 6 and 4) will lie in a clockwise or counter-clockwise position to indicate that the last fugitive-one transfer was negative or positive, respectively. The indicator 536 includes also an up-extending lever 540 which will be sensed by the mechanism shown in FIG. 4 during the readout of the totals and subtotals.

Further details of the accumulator itself are disclosed in appication Serial No. 138,645 and Patent No. 3,108,-745, previously referred to.

DRIVE GEAR STOP

Under certain conditions of operation, the maximum speed at which the machine may be operated is set by the occurrence of erroneous operations. This limit is, in part, determined by the relationship between the inertias of the parts and the forces exerted by the springs, as, for example, the springs on the detent 502 (FIG. 12). While the occurrence of such errors can be moved to a higher speed by increasing the tension of the springs, heavier springs are undesirable because they impose additional loads on other parts of the machine.

Figure 13:
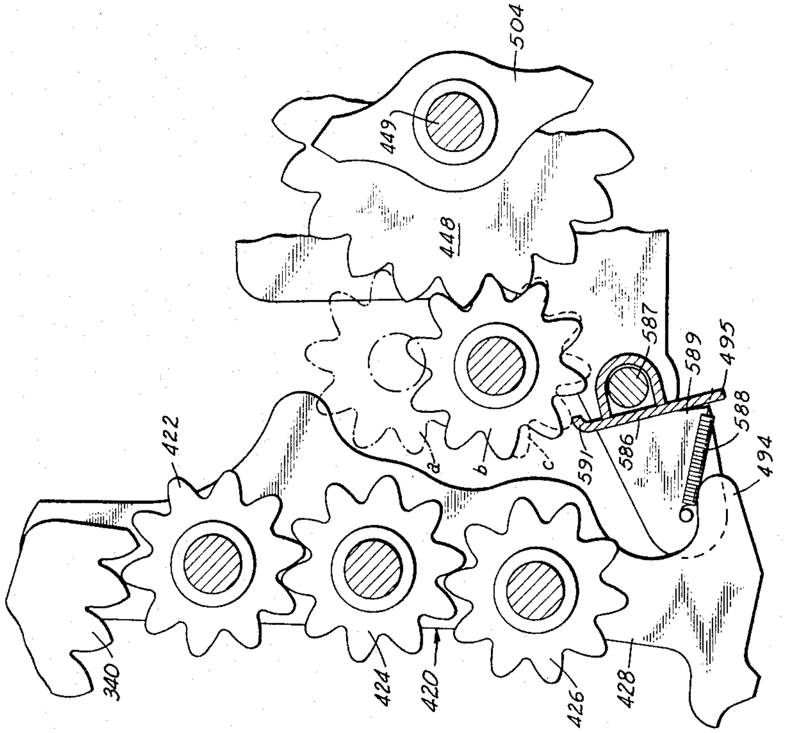

One tendency for errors occurs in the drive gears. When the drive gears 444 are shifted from their upper position shown in FIG. 9 to their lower position, for example, for a subtraction operation, each gear 444 rolls about its corresponding register gear 448, which at that time is stationary. This shifting of the gears is performed very quickly because the gears 444 must be shifted before the pendant 420 is brought into engagement with them, and the pendant must be engaged before the bail rod 344 begins to move down for driving the actuator sectors. Because of the high speed with which the gears 444 thus roll, there is some danger that their rotational momentum will be sufficient, when their descent is suddenly stopped by the pin 460 (FIG. 8), to rotate the register wheels 448 against the restraint imposed by their spring-pressed detents 502 (FIG. 12). To prevent any such overthrow errors, the gears 444 roll against a step bar 586 (FIGS. 13 and 14). This bar is rockably mounted on a rod 587 and urged clockwise in FIG. 13 by a spring 588 against a shoulder 589. In this normal, spring-held position of the bar 586, a forward edge 591 projects into the lower gear space, where it will lie against the face of a tooth of each of the gears 444 when those gears are in their lower position. Thus in FIG. 13, the normal position of the drive gears 444 is the dotted position *a*. As these gears are moved to their lower position, they must roll about the register gears 448, and the solid line position *b* shows the drive gears only slightly above their lowermost position. The final position is the dotted position *c*. The two positions *b* and *c* depict the rolling motion, and show how the teeth of the gears strike against the forward edge 591 of the stop bar. In addition to thus serving as an abutment for stopping the gears 444, the bar 586, in the position shown in FIG. 13, also blocks further rotation in the rolling direction (counter-clockwise in this figure). As is shown in FIG. 14, the left-hand frame member 428 of the pendant 420 carries a projection 494 which, when the pendant is brought into engagement with the drive gears, strikes a projection 495 on the stop bar 586 and rocks it (counter-clockwise in FIGS. 13 and 14) for swinging the forward edge 591 thereof clear of the drive gears 444, so that those gears are free to be driven by the actuator.

MECHANISM FOR CONTROLLING ENTRIES INTO, AND READOUTS FROM, THE ACCUMULATOR

The principal mechanism for controlling the transfer of numbers into and out of the accumulator is located to the right of the accumulator and appears in FIGS. 1, 2, 3 and 5. Parts of it also appear in the exploded perspective of FIG. 15. The function of this mechanism is to move the gear pendant 420 into and out of engagement with the drive gears 444 of the accumulator (FIG. 9), to move the drive gears 444 to their lower position when required for negative entries or positive readouts, and to test the sign of the accumulator, all in response to the actuation of other controls which simply call for addition, subtraction, total, or subtotal, and also to control the printing of symbols and the ribbon color, as will be described.

First, it should be noted that for positive and negative entries to the accumulator, and for total operations, the gear pendant 420 must connect the actuator to the accumulator only during the first half of the machine cycle, whereas, for a subtotal operation, the connection must be maintained during both halves of the cycle. Second, it should be noted that the drive gears 444 must be left in their upper, normal position for addition operations and for the readout of negative number, and must be shifted to their lower position for subtraction operations and positive readouts.

1. *Swing the rear gate pendant*

Figure 15:
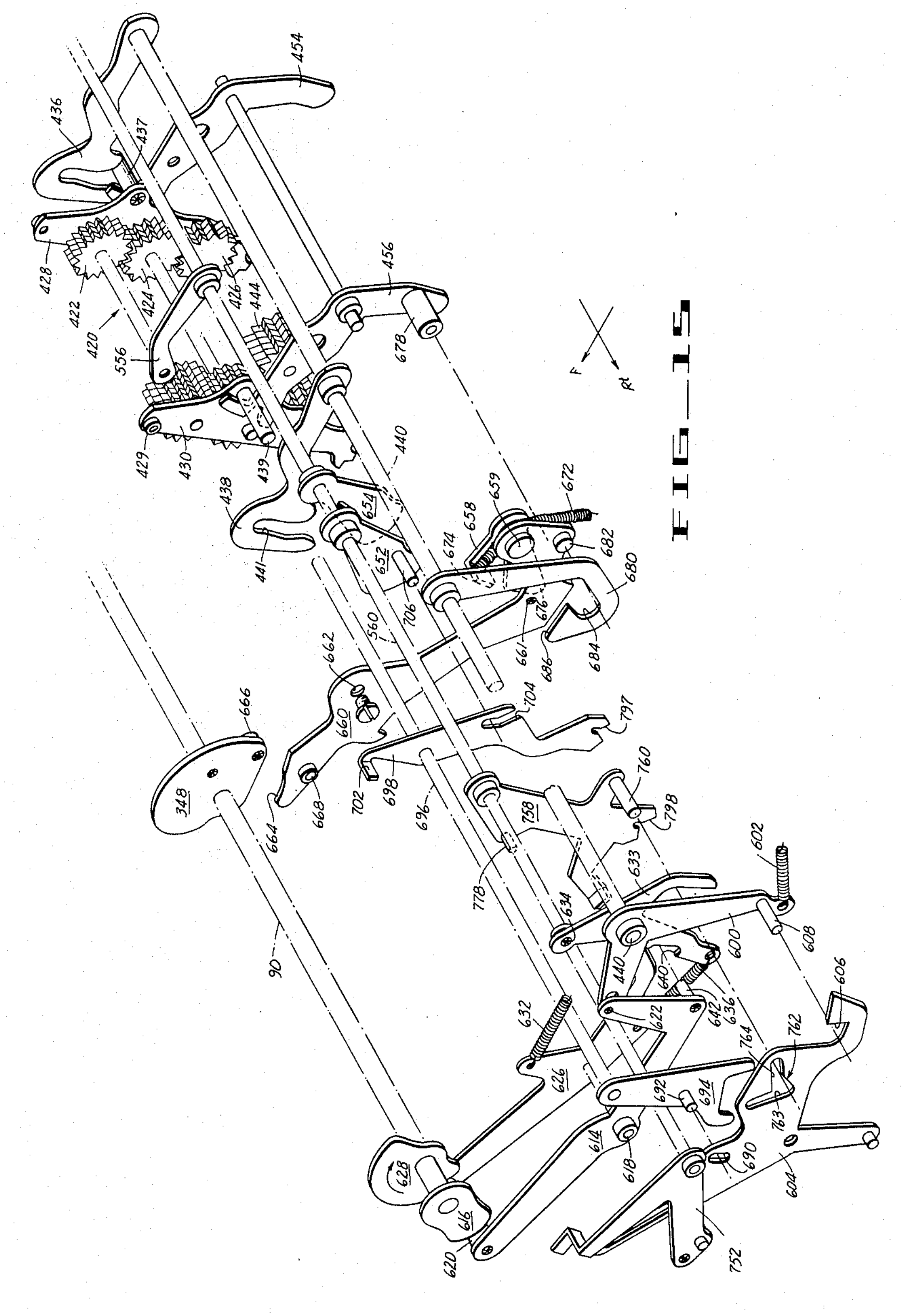
FIG. 15 is an exploded perspective view from the upper right rear showing certain parts of the mechanism that control the entry into, and readout from, the accumulator.

The box cams 436 and 438 (FIG. 15), which control the gear pendant 420, are operated by a bellcrank 600 fixed to the same shaft 440. This bellcrank is biased by a spring 602, which urges the bellcrank 600 and the box cams (in a counter-clockwise direction as seen in FIG. 15) for pulling the gear pendant 420 into engagement with the drive gears 444 (FIG. 9). Normally the box cams are blocked in their upper position (clockwise position in FIG. 15) by a hook plate 604, a hook 606 of which engages a pin 608 on the lower end of the bellcrank 600 as shown, for example, in FIGS. 2 and 16. The hook plate 604 is biased counter-clockwise as seen in these figures by a spring 610 to the limit permitted by a control link 612 (FIGS. 1 and 16), in which position the hook 606 engages the pin 608. When released from the hook 606, the bellcrank 600 may be controlled by the lever 614 and a main rear-pendant cam 616 on the main drive shaft 90. The lever 614 is journalled on a stud 618 (FIG. 2) and carries the roller 620 at its forward end for engaging the cam 616. Its rear end is connected to the forward end of the bellcrank 600 by pin-and-slot connection 622.

Figure 2:
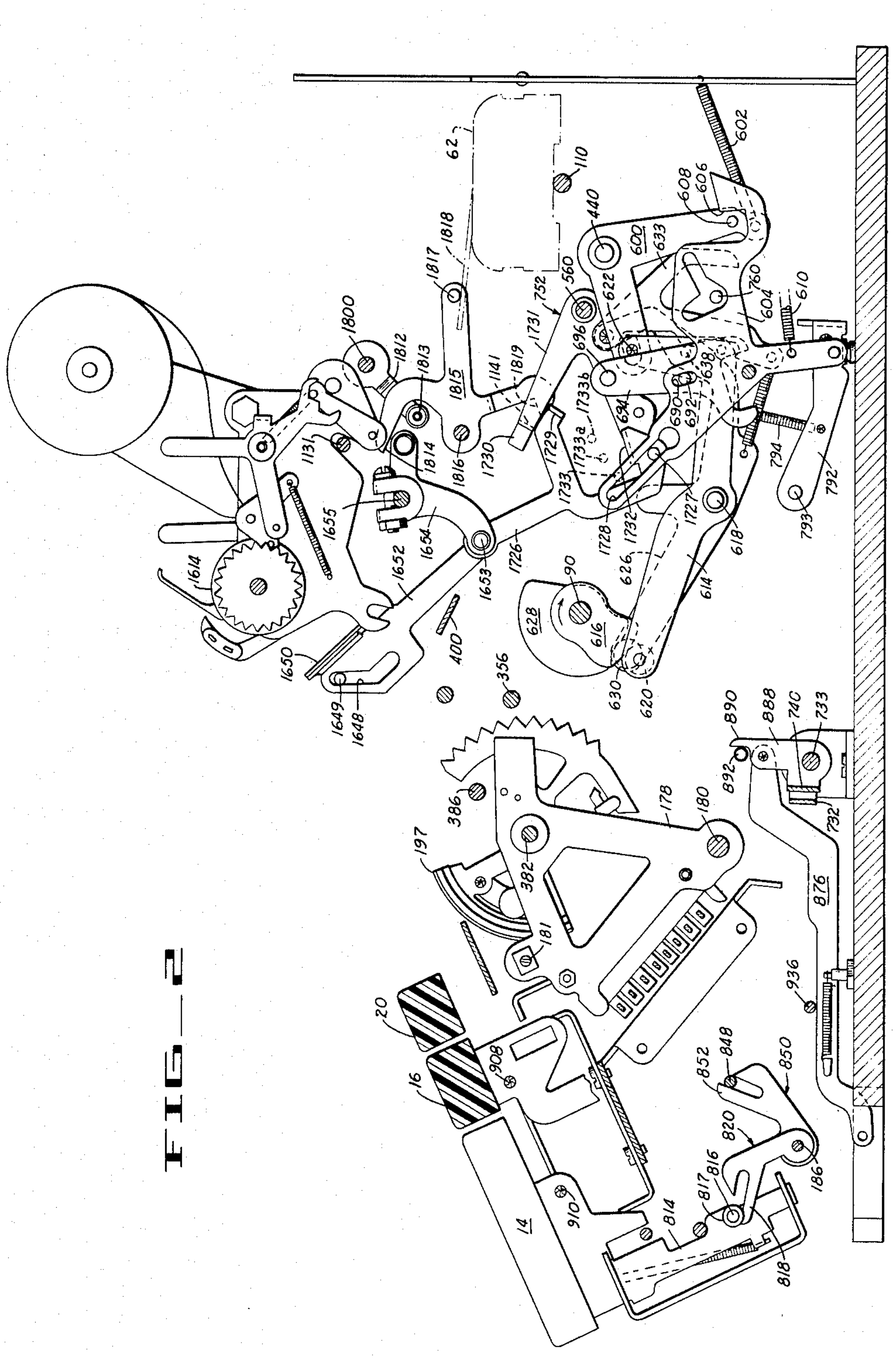

(a) *For subtotal.*—As may best be seen in FIG. 2, the cam 616 has a high portion engaging the roller 620 only near the home position there shown. Consequently, when the arm 614 is controlled by the cam 616, the arm 614 rocks (clockwise in FIGS. 2 and 15) early in the cycle for lowering the box cams 436 and 438 and thereby engaging the gears of the rear pendant 420 with the drive gears 444 of the accumulator (under force of the spring 602). These parts remain in this position through most of the cycle, as is required for a subtotal operation, and as the cam 616 approaches the home position, the high portion thereof again engages the roller 620 for lifting the box cams 436 and 438 and disengaging the gear pendant 420.

Figure 16:
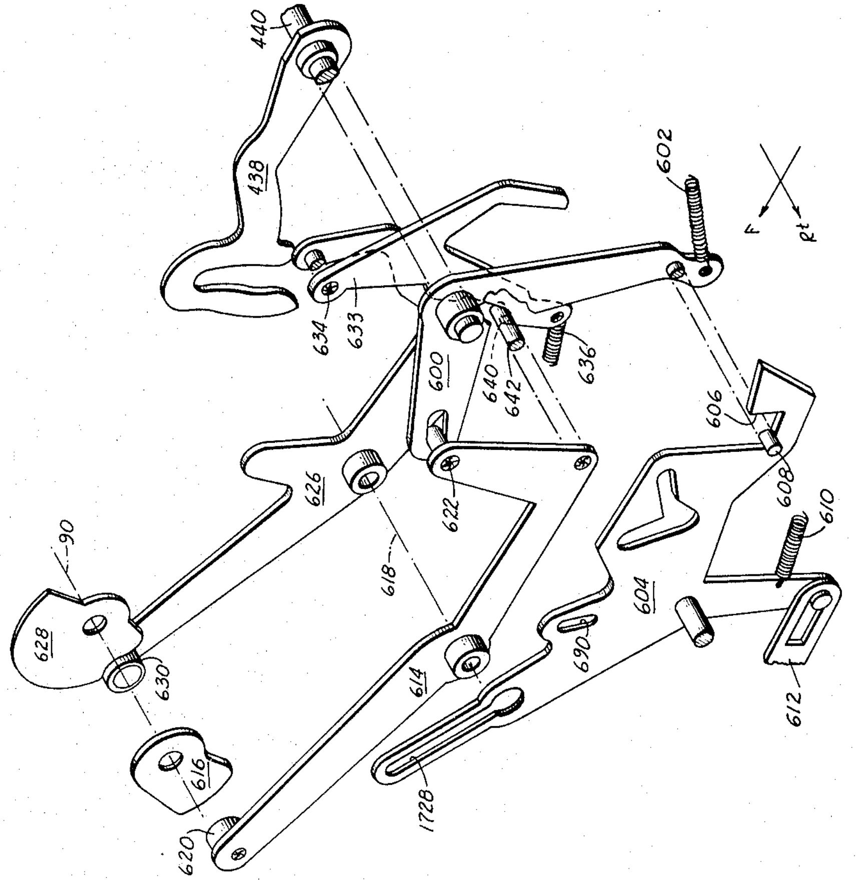
FIG. 16 is an exploded perspective view from the right upper rear showing part of the mechanism for controlling the gear pendant for the accumulator.
Figure 21:
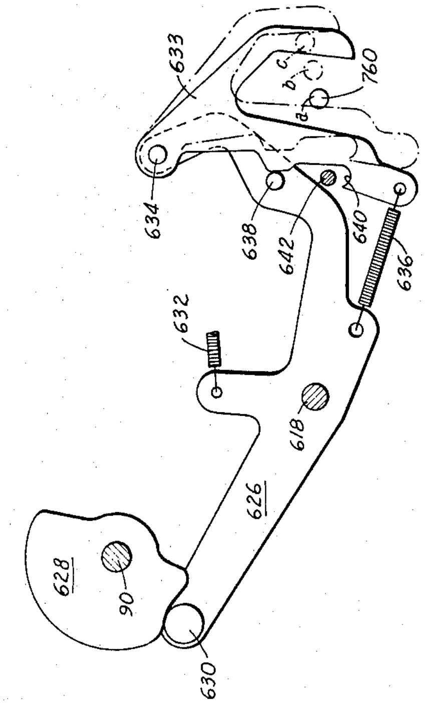
Figure 19:
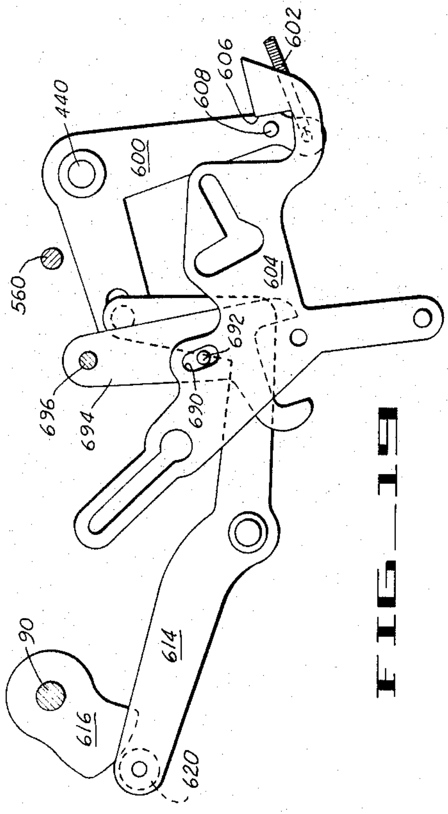

(b) *For addition, subtraction and total.*—Alternatively, the rear pendant 420 may be controlled in part by a lever 626 (FIGS. 2, 15 and 16) and an auxiliary, rear-pendant cam 628 on the main drive shaft 90. Lever 626 is journalled on the stud 618 adjacent the lever 614, and at its forward end carries the roller 630 for riding the cam 628. Lever 626 is biased clockwise as seen in FIGS. 2 and 15 by a spring 632, and it carries a hook 633 pinned to it at 634 and biased by a spring 636 against a stop pin 638 (FIG. 21). The crook 640 of the hook member 633 is arranged to normally engage a pin 642 on the lever 614. When the hook is so engaged, the two cams 616 and 628 operate together for controlling the gear pendant 420, as shown in FIG. 16. As may be seen in FIG. 16, a relieved portion of cam 628 at the home position lowers the hook 633 slightly below pin 642 for easy engagement and disengagement. As the machine cycle begins (FIG. 16), the high portion of the cam 616 moves away from the roller 620 and, as in the case of the subtotal operation, lets the spring 602 rotate the bellcrank 600 for moving the gear pendant into engagement with the accumulator (FIG. 16). At about mid-cycle, the high portion of cam 628 (FIG. 2) moves into engagement with the follower roller 630 and rotates the arm 626 counter-clockwise as seen in these figures. The crook 640 of hook 633 now comes into engagement with the pin 642 so that the arm 614 rotates counter-clockwise with the arm 626, thereby lifting the box cams 436 and 438 for disengaging the gear pendant 420. Cam 628 continues to hold the gear pendant disengaged during the second half of the machine cycle. This is the operation required for add, substract, and total operations of the machine.

2. *Shifting the accumulator drive gears*

Figure 5:
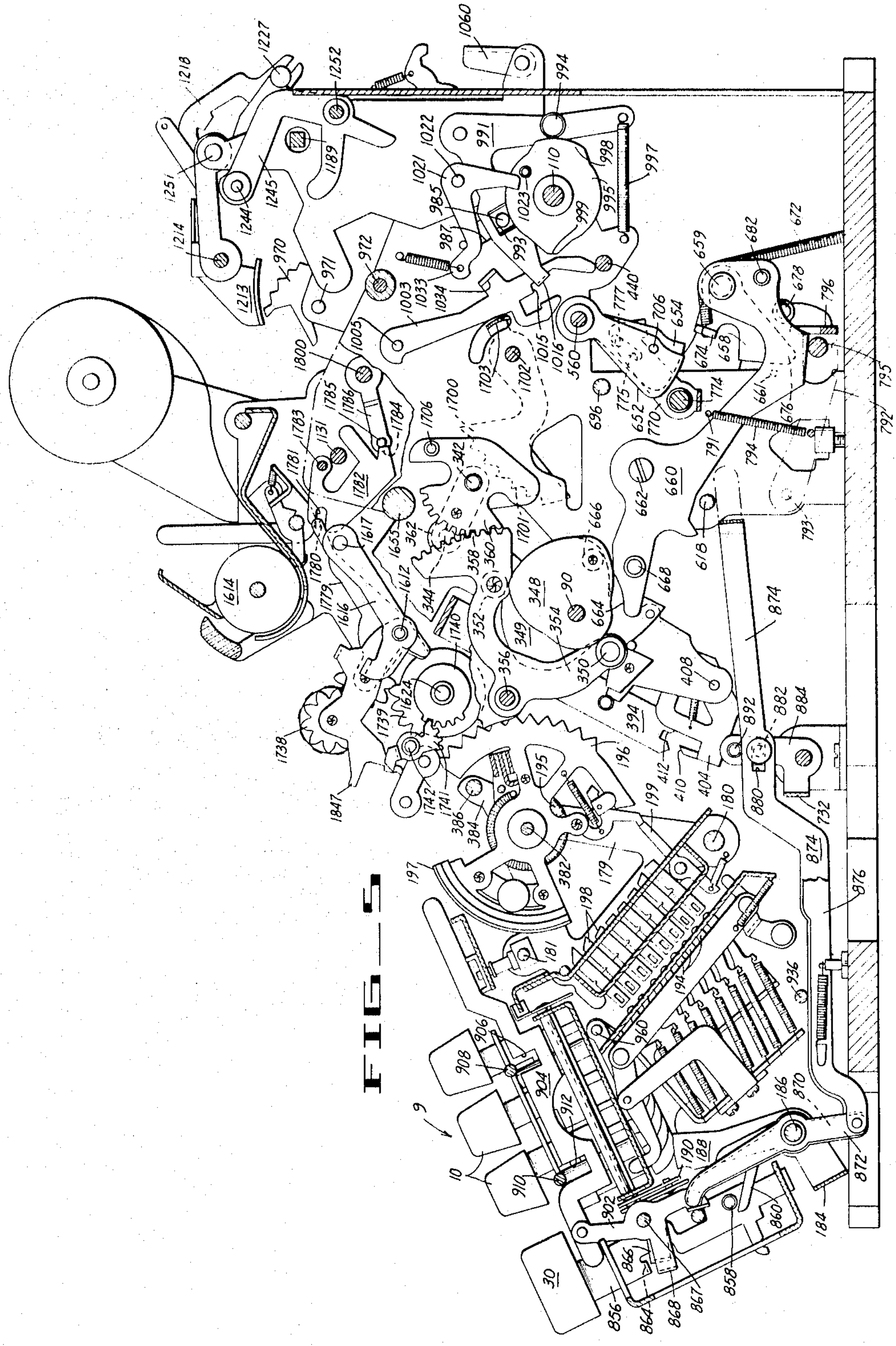
FIG. 5 is a right elevational section taken at a position to the left of that of the section of FIG. 3.
Figure 23:
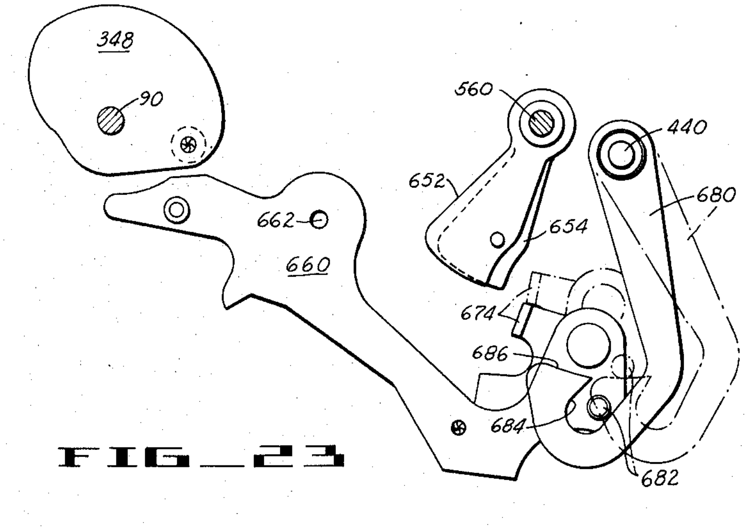

The shifting of the drive gears 444 is controlled by two similar blocking members 652 and 654 journalled free on the total-subtotal shaft 560 (FIGS. 5, 15 and 23). These blocking members are normally held in the position shown in FIG. 5, but when a shift of the drive gears 444 is required, one or the other of these blocking members moves rearward. Their position is then tested by a dog 658 that is journalled on a pin 659 on a lever 660. This lever is journalled on a stud 662 and its forward end (left in FIGS. 5 and 15) has a cam surface 664 arranged to be engaged at the start of each machine cycle by a roller 666 between the two actuator cams 348 and 349. Lever 660 also carries a roller 668 that is held depressed by the periphery of cam 348 until about mid-cycle. Lever 660 is biased to its lower position, and the dog 658 is biased against a pin 661 (clockwise as seen in these figures) by a spring 672 (FIG. 5) that is fastened to an ear 674 on the dog 658 and extends over the pin 659 and down to the frame of the machine. A tail portion 676 of the dog 658 lies forward of a roller 678 (FIGS. 8, 15 and 23) on the lower end of the right-hand arm 456 of the drive gear assembly.

Figure 24:
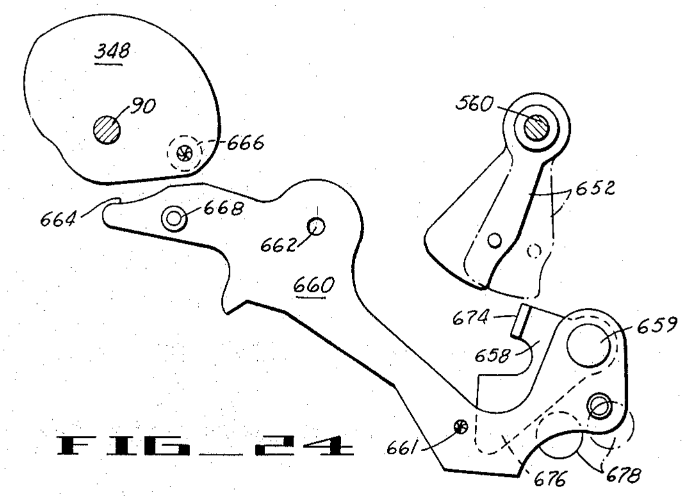
Figure 25:
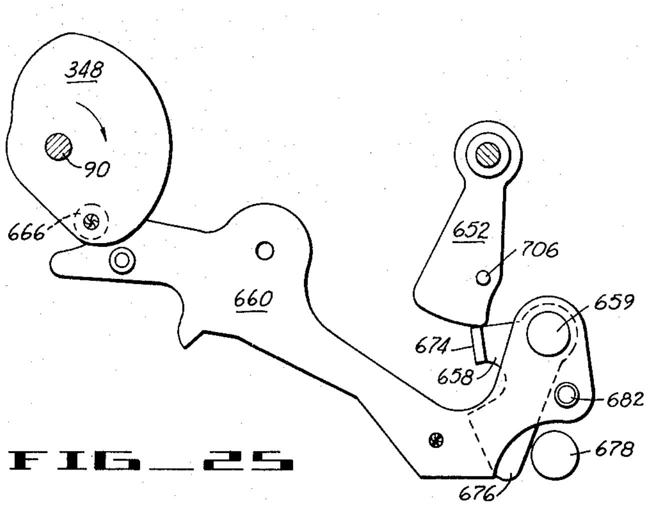

Promptly at the beginning of each machine cycle, the roller 666 on the cams 348 and 349 depresses the cam surfaces 664 on the lever 660 for lifting the dog 658 to test the positions of the blocks 652 and 654. If these blocks are in their normal positions, so that no shifting of the drive gears 444 is required, the ear 674 on the dog 658 will simply rise to the rear of the two blocking members 652 and 654, as shown in dotted lines in FIG. 23. But if either blocking member has been moved rearward, it will overlie the ear 674, for example, as shown in FIG. 24. Under this condition, when the lever 660 is rocked to lift the dog 658, the ear 674 is blocked and the dog 658 must turn (counter-clockwise as shown in FIG. 25). This action swings the tail 676 rearward against the roller 678 for swinging the arm 456 (FIG. 7) counter-clockwise for lowering the drive gears 444. This shifting takes place promptly at the start of the machine cycle and is completed before cam 616 (FIGS. 15 and 16) permits the pendant 420 to be engaged.

3. *Interlocking the drive gears and rear pendant*

A second interlock action between the motions of the drive gear assembly and the gear pendant 420 is provided by a curved arm 680 (FIGS. 3 and 23) fixed to box cam shaft 440 and cooperating with a pin 682 on the lever 660. In FIG. 23, these parts are shown in their normal position in solid lines, which show pin 682 lying in a slot 684 provided by the hook-shaped lower end of the arm 680. The initial action is the lifting of the rear end (right in FIG. 23) of the lever 660, and since the lever turns about its support 662, the pin 682 swings substantially free in the slot 684. The highest position of pin 682 is its dotted position in FIG. 23. In this position the pin is clear of the end surface 686 of the crook portion of arm 680. Accordingly, shaft 440 and arm 680 can now turn (counter-clockwise in FIG. 23) for lowering the box cams 436 and 438 (FIG. 15) and bringing the gear pendant 420 into engagement with the drive gears 444. This movement of arm 680 brings the end surface 686 under the pin 682, as shown by the dotted position of these two parts in FIG. 23, so that the arm 680 prevents return movement of arm 660 as long as the box cams 436 and 438 hold the gear pendant 420 in engagement with the drive gears 444. This interlock action between arm 680 and pin 682, among other things, holds lever 660 in its upper position until shaft 440 lifts the box cams 436 and 438 for disengaging the gear pendant 420. This control of lever 660 is particularly desirable during a subtotal operation, because in that operation the pendant is kept in engagement until near the end of the machine cycle, whereas cam 348 releases lever 660 near mid-cycle.

4. *Addition and subtraction*

For an addition operation, the link 612 (FIGS. 1 and 16) is moved forward (left in these views) a short distance and rocks the hook plate 604 clockwise sufficiently that hook 606 unblocks pin 608. Plate 604 also has a slot 690 (FIG. 15) which receives a pin 692 carried by a lever 694 fixed to an add-subtract shaft 696 to which is also fixed a lever 698. At the top of this lever is an ear

702 which is part of the symbol control mechanism (FIG. 3) as will be described. Below the shaft 696, the lever 698 has a slot 704 which embraces a pin 706 on the blocking member 652 (see also FIG. 22). The slight rotation (counter-clockwise in these views) of this lever 698 and the consequent counter-clockwise rotation of the blocking member 652 brings this member into alignment with the position of the other similar blocking member 654 (FIG. 5), but does not bring it far enough rearward (right in this view) to intercept the ear 674 of the dog 658. Consequently, for this addition operation the drive gears 444 will be left in their upper, normal position. Since the slight rotation of the hook plate 604 (FIG. 16) has disengaged the hook 606 from the pin 608, and since nothing has disengaged the hook 633 from the pin 642, the machine will perform an addition operation as previously described.

For a subtraction operation the link 612 moves forward a distance substantially twice the distance it is moved for an addition operation. This action produces a greater rotation of the hook plate 604 (FIG. 15), lever 694, lever 698 and the block 652. This greater rearward movement of block 652 brings it into the blocking position, shown, for example, in dotted lines in FIG. 24 so that it intercepts the dog 658 (FIG. 25) and causes the drive gears 444 to be shifted to their lower position for the negative entry. Like the addition operation, the subtraction operation disengages the hook 606 from the pin 608 (FIG. 16) for engaging the pendant 420 with the drive gears under control of both of the cams 616 and 628.

5. *Total and subtotal*

Figure 17:
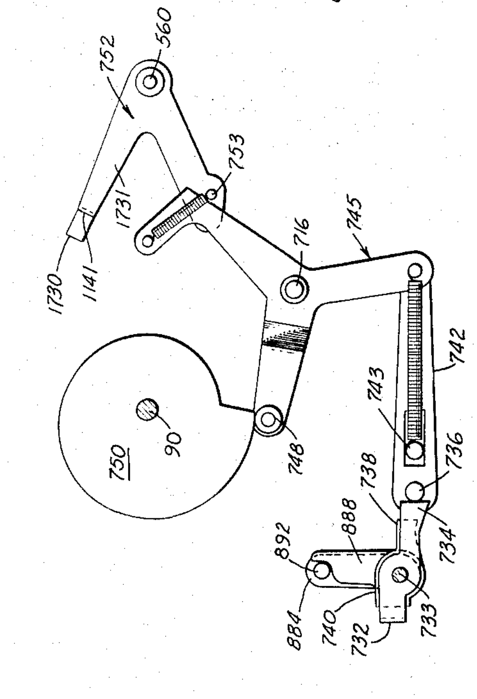
FIGS. 17 and 18 are right elevational detail views of part of the total-subtotal control shown in FIG. 1.

For a total operation a bail 732 (FIGS. 1 and 17) is rocked on its shaft 733 for lifting the tip 734 and releasing a pin 736 for forward movement (left in these figures). When so released, pin 736 moves forward into engagement with a similar, but shorter, tip 738 on a similar subtotal bail 740. For a subtotal operation, both bails 732 and 740 are rocked for releasing pin 736 for a greater forward movement. Pin 736 is carried on a link 742 guided at its forward end on a stationary pin 743 and connected at its rear end to a down-extending leg of a bellcrank 745 journalled on the stud 716. A forward-extending arm of the bellcrank carries a roller 748 that rides a total control cam 750.

(a) *Setting total-subtotal shaft 560*.—Normally the link 742 and bellcrank 745 are restrained by the tip 734 of bail 732, but if the total bail 732, or both bails 732 and 740, have been rocked, the roller 748 drops off the high point of cam 750 promptly at the beginning of the machine cycle. The resulting rotation of bellcrank 745 (clockwise in FIGS. 1 and 17) rocks a bellcrank 752 which is fixed to the total-subtotal shaft 560 (see also FIG. 15). The connection between bellcranks 745 and 752 is provided by a pin 753 on the bellcrank 752, which is spring-urged against one leg of the bellcrank 745. As may be seen in FIG. 18, a second pin 754 on the bellcrank 752 overlies the rearward extending arm of the bellcrank 724. Thus the clockwise rotation of bellcrank 745 (in FIG. 17) and the resulting counter-clockwise rotation of bellcrank 752, lifts the forward end of bellcrank 724 (FIG. 18) and disengages the notch 708 from the ear 400 of the front gear pendant, so that the actuator will not be connected to the selector unit during the total and subtotal operations.

Figure 20:
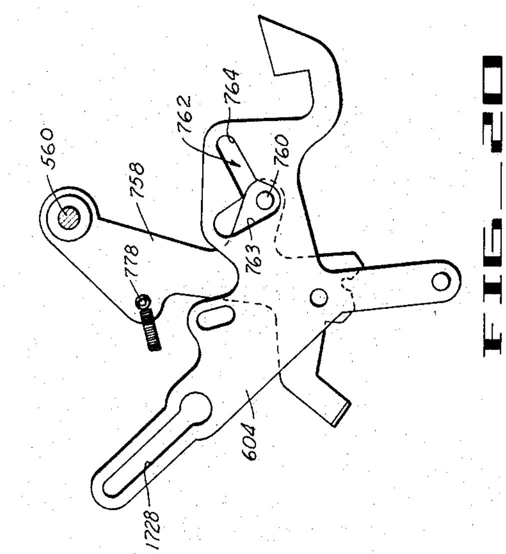
FIGS. 19 through 25 are enlarged right elevational details for explaining the operation of the mechanisms shown, for example, in FIG. 15.

(b) *Setting hook plate 604* (*FIG. 15*).—Fixed to the total-subtotal shaft 560 is a control lever 758 (FIGS. 3, 15 and 22) which carries a pin 760 that lies in an opening 762 of the hook plate 604 (FIGS. 2 and 15). The pin 760 is shown in its normal position in the slot 762 in FIGS. 2 and 20. The slot includes a portion 763 which clears the pin 760 when the hook plate 604 is rocked (clockwise in these figures) for the add and subtract operations previously described. The slot 762 also includes a portion 764 into which the pin 760 moves for the total and subtotal operations. This portion 764 is cam-shaped so that the rearward movement of pin 760 rocks the plate 604 for disengaging the hook 606 from the pin 608 so that the bellcrank 600 (FIG. 16) can be rocked by the spring 602 under control of the cams 616 and 628 for rocking the box cams 436 and 438 for engaging the rear gear pendant 420 with the drive gears 444.

It will be recalled that the bails 732 and 740 (FIGS. 1 and 17) permit different amounts of motion of the link 742 and the bellcrank 745. Accordingly, the shaft 560 and control lever 758 rock (counter-clockwise in FIGS. 15 and 20) one amount for the total operation, and a greater amount for the subtotal operation. The shape of the lower edge 764 of the slot in the cam plate 604 is such that the movement of pin 760 through these two different distances for the total and subtotal, produce the same angular motion of plate 604. Furthermore, this is the same amount of motion as the plate 604 makes for the addition operation previously described, so that the resultant movement of block 652 (FIGS. 15 and 23) is the same amount as for the addition operation and is insufficient to make the block 652 intercept the gear 674 of the dog 658. Consequently, this action does not control the position of the drive gear 444.

(c) *Control of hook 633* (*FIG. 21*).—The pin 760 (FIG. 15) extends between the two legs of the hook member 633 (FIGS. 2 and 21). The normal position of the pin with respect to this hook member is shown in solid lines at position *a* in FIG. 21, and the position to which it is moved for a total operation is indicated at *b*. In neither of these positions does the pin 760 move the hook member 633. Consequently, the hook remains in engagement with the pin 642 (see also FIG. 16) so that the bellcrank 600 is controlled by both of the cams 616 and 628 for engaging the gear pendant 420 with the drive gears only during the first half of the machine cycle, as previously described. For the subtotal operation, the greater rotation of the lever 758 moves the pin 760 to the dotted position *c* in FIG. 21 so that it rocks the hook member 633 to the position shown in dotted lines and disengages the hook 633 from the pin 642. Consequently, in the subtotal operation the bellcrank 600 (FIG. 15) and the gear pendant 420 are controlled only by the main rear-pendant cam 616 so that the gear pendant 420 is held in engagement with the drive gears 444 of the accumulator during both the first and second halves of the machine cycle.

Figure 3:
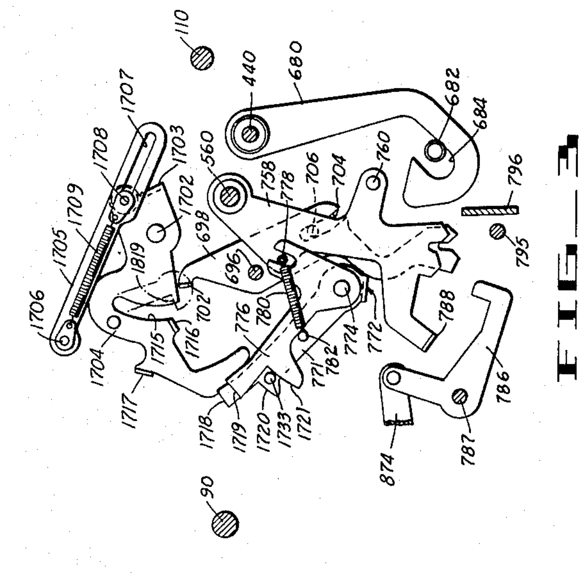
FIG. 3 is a right elevational partial section taken along a line to the left of the section of FIG. 2, also showing mechanism for accumulator entries and totals.
Figure 4:
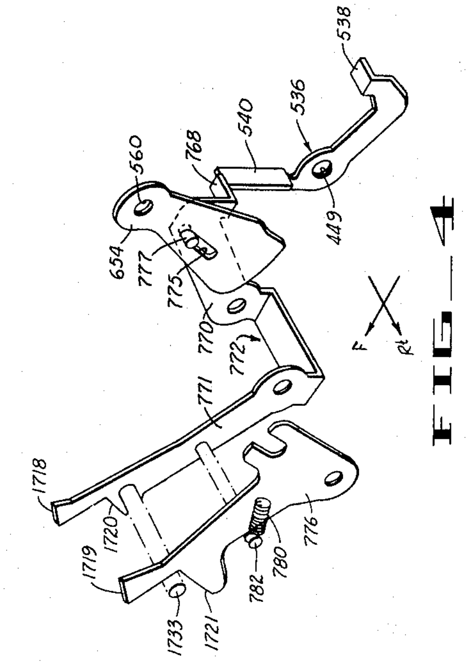
FIG. 4 is an exploded perspective taken from the upper right rear for explaining the operation of the mechanism appearing in FIGS. 3, 5 and 6, for testing the sign of the number in the accumulator.

(d) *Sign control*.—It will be recalled that in a subtotal or total operation, the position of the drive gears 444 must correspond to the sign of the number that is being withdrawn from the accumulator, and that the sign is indicated by the indicator 536 (FIGS. 4 and 6) which stands in the position in which it was set by the most recent fugitive-one transfer. If the number in the accumulator is negative, the up-extending arm 540 of the indicator 536 (FIG. 4) stands directly under, and just clear of, an ear 768 on the rear end of a bail arm 770 of a bail 772 journalled on a shaft 774 (see also FIG. 3). Bail arm 770 carries a pin 777 which lies in a slot 775 of blocking member 654 (see also FIG. 5). Also journalled on the shaft 774 is a lever 776 (FIGS. 3 and 4) having a notch that embraces a pin 778 on the total-subtotal control lever 758 (FIG. 15). A spring 780 connected between the pin 778 and a pin 782 on the bail arm 771 of bail 772 biases the bail 772 (clockwise as seen in FIGS. 3 and 4) and normally holds the pin 782 against the lever 776, as seen, for example, in FIG. 3. When the lever 758 (FIG. 15) is rocked counter-clockwise in either a total or subtotal operation, the engagement of the pin 778 in the notch of the lever 776 causes that lever to turn (clockwise in FIG. 3). The lever 771, being urged by spring 780, tends to follow this movement, but if the number in the accumulator is negative, the ear 768

(FIG. 4) immediately abuts the upper end of the arm 540 of the sign indicator. The bail 772 then is unable to follow the motion (clockwise in these figures) of the lever 776 and so does not transmit any motion to the blocking member 654. Consequently, the block 654 (FIG. 23) remains clear of the dog 658 and the drive gears 444 are left in their upper position which is correct for reading out the negative number.

However, if there is a positive number in the accumulator, the arm 540 of indicator 536 (FIG. 4) will stand clear (to the left in FIG. 4) of the ear 768 of the bail 772. Accordingly, this bail, urged by spring 780, will follow the motion of lever 776 (see FIG. 3). This action swings blocking member 654 toward the rear and puts it in position to block the ear 674 of the dog 658, similarly to the action of member 676 shown in FIG. 25. Consequently, as the arm 660 rises, dog 658 rotates about its support 659 and drives the roller 678 rearward (FIG. 25) for shifting the drive gears 444 to their lower position for the readout of a positive number.

6. *Aligning lever 792 (FIG. 22)*

Figure 22:
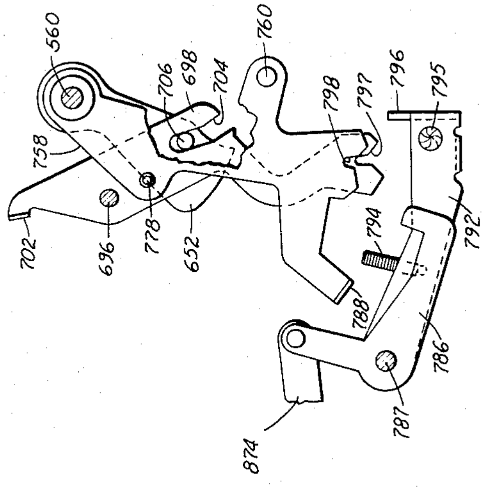

In FIG. 5, an aligning lever 792 journalled at 793 is urged up by a spring 794. A pin 795 on the lever 792 underlies the lever 660. Consequently, the spring 794 holds the lever 792 up so that the pin 795 rides on the bottom of lever 660. Lever 792 includes a blade, or ear, 796 which engages the lower ends of the control levers 698 and 758 (FIGS. 3, 15 and 22). It will be recalled that lever 660 is lifted early in the cycle by cam roller 666 (FIG. 5) and then held beyond mid-cycle by cam 348, and that during subtotal operation it is held up still longer by the interlocking lever 680 (FIG. 23). When the levers 698 and 758 are in their normal positions (shown, for example, in FIG. 22), the blade 796 rises to the rear of these levers for holding them in those normal positions during the operation. The lever 698 has a notch 797 in its lower end that is aligned with the blade 796 when the lever is in its addition setting. When this lever is in its fully operated position, that is, the subtraction position, the blade 796 rises to the front of it. Lever 758 has a similar notch 798, and is similarly locked by blade 796. Thus, the blade 796 of the lever 792 prevents either of these control levers from changing its position during any operation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a calculating machine, an actuator, a gear pendant for said actuator having a train of gears for each numerical order, an accumulator including a register gear for each order, said register gears being coaxial, a drive gear in mesh with each register gear, said drive gears being coaxial and shiftable together circumferentially of said register gears between two positions in which each drive gear is aligned with two different gears of the train of said pendant, means for shifting said drive gears between said two positions for reversing the sense of the connection between said actuator and accumulator, and means for moving said pendant into engagement with said drive gears.

2. The combination of claim 1 wherein there is included an overthrow stop for said drive gears, said overthrow stop normally projecting into an inter-tooth space of said drive gears in one shifted position thereof, whereby to prevent the momentum imparted to said drive gears during the shifting from rotating said register gears, and means for withdrawing said stop from said inter-toothed space when said pendant is moved into engagement with said drive gears as aforesaid.

References Cited by the Examiner

UNITED STATES PATENTS

| | | | |
|---|---|---|---|
| 2,396,188 | 3/1946 | Mehan et al. | 235—60 |
| 2,883,105 | 4/1959 | Grobl et al. | 235—60 |

LEO SMILOW, *Primary Examiner.*

W. M. HOBBY, *Assistant Examiner.*